(12) United States Patent
Shimizu et al.

(10) Patent No.: US 7,837,448 B2
(45) Date of Patent: Nov. 23, 2010

(54) SUPERCHARGER

(75) Inventors: Masahiro Shimizu, Tokyo (JP); Yukio Takahashi, Tokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 999 days.

(21) Appl. No.: 11/617,211

(22) Filed: Dec. 28, 2006

(65) Prior Publication Data

US 2007/0172365 A1     Jul. 26, 2007

(30) Foreign Application Priority Data

Jan. 26, 2006     (JP)     ............... 2006-018000

(51) Int. Cl.
*F04B 9/14* (2006.01)
*F04B 17/02* (2006.01)
*F02B 33/44* (2006.01)

(52) U.S. Cl. ...................... 417/374; 417/407; 60/605.3; 123/559.1

(58) Field of Classification Search ................ 417/365, 417/374, 407; 415/104, 112; 60/607, 605.1, 60/605.3; 123/559.1
See application file for complete search history.

(56) References Cited

U.S. PATENT DOCUMENTS

| 3,675,056 A | 7/1972 | Lenz |
| 3,742,123 A | 6/1973 | Haub, Jr. |
| 3,778,194 A | 12/1973 | Miller et al. |
| 3,927,530 A | 12/1975 | Braun |
| 3,961,867 A * | 6/1976 | Woollenweber ............. 417/407 |
| 4,198,063 A * | 4/1980 | Shimizu et al. ............. 277/387 |

(Continued)

FOREIGN PATENT DOCUMENTS

CA     2068369     11/1992

(Continued)

OTHER PUBLICATIONS

Microfilm of the specification and drawings annexed to the request of Japanese Utility Model Application No. 10710/1983 (Laid-open No. 116537/1984), Toyota Motor Corp, Aug. 6, 1984.

(Continued)

*Primary Examiner*—Charles G Freay
(74) *Attorney, Agent, or Firm*—Griffin & Szipl, P.C.

(57) ABSTRACT

An oil seal structure of a supercharger (10) has an oil shield member (21), a seal housing (25), and an annular seal member (23) arranged between the oil shield member (21) and the seal housing (25). The oil shield member (21) has a portion in which an approximately circular outer edge is formed in a vertical cross section to an axial direction, in a leading end portion in a compressor side, and the oil shield member (21) has an outer edge reduced-diameter portion (21*a*) which is formed in the leading end in the compressor side and in which a radius of the outer edge is smaller than the other portions of the outer edge. The seal member (23) is fitted to the outer edge reduced-diameter portion (21*a*). An opening through which the oil shield member (21) passes is formed in the seal housing (25), and the seal housing (25) is brought into contact with the seal member (23) in an inner edge in a radial direction forming the opening.

11 Claims, 7 Drawing Sheets

U.S. PATENT DOCUMENTS

| | | | |
|---|---|---|---|
| 4,253,031 A | 2/1981 | Frister | |
| 4,301,375 A | 11/1981 | Anderson | |
| 4,641,977 A * | 2/1987 | Woollenweber | 384/99 |
| 4,704,075 A * | 11/1987 | Johnston et al. | 417/407 |
| 4,745,755 A | 5/1988 | Kawamura | |
| 4,757,686 A | 7/1988 | Kawamura et al. | |
| 4,833,887 A | 5/1989 | Kawamura et al. | |
| 5,121,605 A | 6/1992 | Oda et al. | |
| 5,323,613 A | 6/1994 | Akiyama | |
| 5,587,332 A | 12/1996 | Chang et al. | |
| 5,605,045 A | 2/1997 | Halimi et al. | |
| 5,798,587 A | 8/1998 | Lee | |
| 5,834,117 A | 11/1998 | Onishi | |
| 5,857,332 A | 1/1999 | Johnston et al. | |
| 5,870,894 A | 2/1999 | Woollenweber et al. | |
| 5,904,471 A | 5/1999 | Woollenweber et al. | |
| 5,906,098 A | 5/1999 | Woollenweber et al. | |
| 6,032,466 A | 3/2000 | Woollenweber et al. | |
| 6,102,672 A | 8/2000 | Woollenweber et al. | |
| 6,129,524 A | 10/2000 | Woollenweber et al. | |
| 6,145,314 A * | 11/2000 | Woollenweber et al. | 60/607 |
| 6,160,332 A | 12/2000 | Tsuruhara | |
| 6,218,747 B1 | 4/2001 | Tsuruhara | |
| 6,257,834 B1 | 7/2001 | Bremer et al. | |
| 6,278,199 B1 | 8/2001 | Grant et al. | |
| 6,293,769 B1 | 9/2001 | Radermacher et al. | |
| 6,416,281 B1 | 7/2002 | Bremer et al. | |
| 6,449,950 B1 | 9/2002 | Allen et al. | |
| 6,609,375 B2 | 8/2003 | Allen et al. | |
| 6,647,724 B1 | 11/2003 | Arnold et al. | |
| 6,668,553 B1 | 12/2003 | Ghizawi | |
| 6,768,332 B2 | 7/2004 | Lin et al. | |
| 6,871,499 B1 | 3/2005 | Allen et al. | |
| 6,986,648 B2 | 1/2006 | Williams et al. | |
| 7,008,194 B2 * | 3/2006 | Frankenstein | 417/407 |
| 7,010,916 B2 | 3/2006 | Sumser et al. | |
| 7,056,103 B2 | 6/2006 | LaRue | |
| 7,352,077 B2 | 4/2008 | Shibui et al. | |
| 7,360,361 B2 | 4/2008 | Prusinski et al. | |
| 7,458,214 B2 | 12/2008 | Philippe | |
| 2003/0051475 A1 | 3/2003 | Allen et al. | |
| 2003/0118461 A1 | 6/2003 | Hodapp et al. | |
| 2005/0082941 A1 | 4/2005 | Iida et al. | |
| 2006/0081226 A1 | 4/2006 | Bolz | |
| 2006/0123783 A1 | 6/2006 | Phillipe | |
| 2006/0245913 A1 | 11/2006 | Thiele et al. | |
| 2007/0036664 A1 | 2/2007 | Shibui et al. | |

FOREIGN PATENT DOCUMENTS

| | | |
|---|---|---|
| CH | 266731 | 2/1950 |
| CN | 2605696 Y | 3/2004 |
| DE | 4115273 | 6/1992 |
| DE | 10156704 | 5/2003 |
| DE | 10022113 | 11/2005 |
| DE | 10 2005 052 363 | 5/2007 |
| EP | 0079100 | 5/1983 |
| EP | 0212988 | 3/1987 |
| EP | 0304259 | 2/1989 |
| EP | 1348848 | 10/2003 |
| FR | 2859499 | 3/2005 |
| GB | 2 021 874 A | 12/1979 |
| GB | 2162377 | 1/1986 |
| JP | 58-124024 | 7/1983 |
| JP | 61-49126 | 4/1986 |
| JP | 01-019122 | 1/1989 |
| JP | 01-171006 | 7/1989 |
| JP | 02-099722 | 4/1990 |
| JP | 03-138430 | 6/1991 |
| JP | 4-119624 | 10/1992 |
| JP | 05199708 | 8/1993 |
| JP | 06-288242 | 10/1994 |
| JP | 06-346748 | 12/1994 |
| JP | 07-102988 | 4/1995 |
| JP | 10-299500 | 11/1998 |
| JP | 11-182259 | 7/1999 |
| JP | 2000-110577 | 4/2000 |
| JP | 2000-130176 | 5/2000 |
| JP | 2000-145468 | 5/2000 |
| JP | 2000145468 A | 5/2000 |
| JP | 2000-514987 | 11/2000 |
| JP | 2001-295655 | 10/2001 |
| JP | 2001-527613 | 12/2001 |
| JP | 3389748 | 3/2003 |
| JP | 2003-232340 | 8/2003 |
| JP | 2003232340 A | 8/2003 |
| JP | 2003-293785 | 10/2003 |
| JP | 2004-003420 | 1/2004 |
| JP | 2004-044451 | 2/2004 |
| JP | 2004-044452 | 2/2004 |
| JP | 2004-144094 | 5/2004 |
| JP | 2005-023920 | 1/2005 |
| JP | 2005-069178 | 3/2005 |
| JP | 2005-120927 | 5/2005 |
| JP | 2005-207337 | 8/2005 |
| JP | 2005207337 A | 8/2005 |
| JP | 2005-248799 | 9/2005 |
| JP | 2005248799 A | 9/2005 |
| JP | 2006-002568 | 1/2006 |
| JP | 2006-514526 | 4/2006 |
| JP | 2007-309101 | 11/2007 |
| JP | 2008-029166 | 2/2008 |
| WO | 84/04136 | 10/1984 |
| WO | 98-02652 | 1/1998 |
| WO | 98/30790 | 7/1998 |
| WO | 2005/024202 A1 | 3/2005 |
| WO | 2005/028876 A1 | 3/2005 |
| WO | 2005/113961 A1 | 12/2005 |

OTHER PUBLICATIONS

Microfilm of the specification and drawings annexed to the request of Japanese Utility Model Application No. 142414/1985 ( Laid-open No. 49629/1987), Nissan Motor Corp, Mar. 27, 1987.

Microfilm of the specification and drawings annexed to the request of Japanese Utility Model Application No. 115203/1986 (Laid-open No. 22301/1988), Nissan Motor Corp, Feb. 15, 1988.

Microfilm of the specification and drawings annexed to the request of Japanese Utility Model Application No. 134167/1984 (Laid-open No. 49126/1986), dated Apr. 2, 1986.

Office Action issued in related Korean Patent Application No. 10-2007-0005555 (included herein in Korean and Japanese) dated Mar. 30, 2009.

European Search Report issued in corresponding application No. EP 06026508.9, completed May 31, 2007 and mailed Jun. 11, 2007.

Chinese Office Action issued in co-pending U.S. Appl. No. 12/377,987, Chinese Patent Application No. 200780030544.0. mailed Mar. 8, 2010.

First Office Action, issued in corresponding Chinese Patent Application No. 200780020456.2, issued Nov. 20, 2009.

* cited by examiner

SUPERCHARGER

This application claims priority from Japanese Patent Application No. 018000/2006, filed Jan. 26, 2006, the entire disclosure of which is incorporated herein by reference.

BACKGROUND OF THE INVENTION

1. Technical Field of the Invention

The present invention relates to a supercharger.

2. Description of the Related Art

A supercharger is provided with a turbine and a compressor as a basic structure, the turbine has a turbine impeller rotationally driven by an exhaust gas of an engine, and the compressor has a compressor impeller rotationally driven by a rotation of the turbine impeller. Further, in order to transmit a rotational driving force from the turbine to the compressor, a rotating shaft coupling the turbine impeller and the compressor is provided in the supercharger.

On the basis of the structure mentioned above, the turbine impeller is rotated by the exhaust gas of the engine, the compressor impeller is rotationally driven therewith, and the compressed air is supplied to the engine from the compressor. Accordingly, a supercharged state equal to or more than a natural air supply is achieved in the engine, and the engine is set to a high-power state.

In order to rotatably support the rotating shaft mentioned above, a bearing structure is incorporated in an inner portion of a housing of the supercharger, and an oil seal structure is incorporated in a compressor side of the bearing structure for preventing a lubricating oil supplied to the bearing structure from leaking to the compressor side.

The bearing structure and the oil seal structure mentioned above are disclosed, for example, in patent document 1.

FIG. 1 is a vertical cross sectional view showing an entire structure of a supercharger in the patent document 1, and FIG. 2 is a partly enlarged view of FIG. 1, and shows a bearing structure and an oil seal structure.

As shown in FIG. 2, the bearing structure has a thrust bush 33 fixed to a rotating shaft 31, a normal thrust bearing 37 positioned in a compressor side of the thrust bush 33 and fixed to a bearing housing 35, and a counter thrust bearing 39 positioned in a turbine side of the thrust bush 33 and fixed to the bearing housing 35. Further, the bearing structure has a journal bearing 41 provided in each of the turbine side and the compressor side.

The normal thrust bearing 37 and the counter thrust bearing 39 receive an axial load from the rotating shaft 31 via the thrust bush 33, and the journal bearing 41 receives a radial load from the rotating shaft 31.

In order to supply a lubricating oil to the bearing structure mentioned above, an oil path 43 is formed in the housing, and a dedicated oil path 45 communicating with the oil path 43 and open only to a pad surface thereof is formed in the normal thrust bearing 37.

In order to prevent the lubricating oil supplied to the pad surface through the oil path 43 and the dedicated oil path 45 from leaking to the compressor side, an oil seal structure is provided in the compressor side of the bearing structure.

The oil seal structure has an oil shield member 47 fitted to the rotating shaft 31 in the compressor side of the normal thrust bearing 37.

In the oil shield member 47, a flange portion 47a is formed in an end portion in the turbine side, and one ring groove 47b is formed on an outer peripheral surface in the compressor side in a peripheral direction. An annular seal member 49 is fitted to the ring groove 47b. The seal member 49 is formed, for example, by a metal.

Further, the oil seal structure further has an oil defense plate 51 fixed to the housing in the turbine side of the normal thrust bearing 37.

The oil defense plate 51 is constituted, for example, by a disc-shaped thin plate, has a shape in which a lower portion is folded up to the turbine side, and introduces the lubricating oil after lubricating the normal thrust bearing 37 to an oil discharge port 55.

Further, the oil seal structure has a seal housing 53 fixed to the housing 35 in the compressor side of the oil defense plate 51. The seal housing 53 extends to an inner side in a radial direction from an outer side in a radial direction to a position brought into contact with the seal member 49, and is brought into contact with the seal member 49 mentioned above over a peripheral direction.

Accordingly, it is possible to prevent the lubricating oil from leaking to the compressor side from the seal housing 53.

Patent Document 1: Japanese Unexamined Utility Model Publication No. 4-119624 "bearing structure of turbocharger"

In the oil seal structure in the patent document 1, since the seal member 49 is formed in the annular shape, it is necessary to fit it to the ring groove 47b from an outer side in the radial direction, for attaching it to the ring groove 47b. Further, it is necessary to attach the seal member 49 before incorporating the seal housing 53 in the supercharger, and it is impossible to attach the seal member 49 later. Accordingly, an inconvenience is generated.

As mentioned above, in the patent document 1, a workability at a time of attaching the seal member 49 is deteriorated.

Further, a structure having a higher sealing performance than the oil seal structure in the patent document 1 is desired.

SUMMARY OF THE INVENTION

Accordingly, an object of the present invention is to provide a supercharger which can further improve a workability at a time of attaching a seal member, and can further increase a sealing performance of an oil seal structure.

In order to achieve the object mentioned above, in accordance with the present invention, there is provided a supercharger comprising:

a turbine impeller rotationally driven by an exhaust gas;

a compressor impeller rotationally driven by a rotation of the turbine impeller and compressing an air;

a rotating shaft coupling the turbine impeller and the compressor impeller;

a housing in which a bearing structure rotatably supporting the rotating shaft is incorporated in inner portion; and an oil seal structure preventing a lubricating oil supplied to the bearing structure from leaking to the compressor side, the oil seal structure being incorporated in the compressor side of the bearing structure, wherein the oil seal structure has an oil shield member fixed to the rotating shaft, a seal housing fixed to the housing so as to surround the oil shield member in an outer side in a radial direction of the oil shield member, and an annular seal member arranged between the oil shield member and the seal housing, the oil shield member is provided with a portion having an approximately circular outer edge formed in a vertical cross section to an axial direction in a leading end portion of the compressor side, the oil shield member has an outer edge reduced-diameter portion which is formed in a leading end in the compressor side and in which a radius of the outer edge becomes smaller than the other portions of the outer edge, the seal member is fitted to the outer edge reduced-diameter portion, an opening in which the oil shield member passes through a center portion of the vertical cross section to the axial direction is formed in the seal housing, and the seal housing is brought into contact with the seal member in an inner edge in a radial direction forming the opening, thereby preventing the lubricating oil from leaking to the compressor side.

Since the supercharger mentioned above is structured such that the seal member is fitted to the outer edge reduced-diameter portion formed in the leading end in the compressor side of the oil shield member, it is possible to be fitted to the outer edge reduced-diameter portion of the oil shield member only by moving the seal member in the axial direction from the compressor side at a time of assembling the supercharger. Further, since it is possible to attach the seal member only by moving the seal member in the axial direction, it is possible to attach the seal member even after incorporating the seal housing.

Accordingly, in the supercharger mentioned above, it is possible to make a mounting work of the seal member more simple than the conventional one.

In accordance with a preferable aspect of the present invention, the oil shield member has an outer edge increased-diameter portion which is connected to the outer edge reduced-diameter portion from the turbine side in the axial direction and in which the radius of the outer edge is larger than the outer edge reduced-diameter portion.

As mentioned above, since the oil shield member has the outer edge increased-diameter portion connected to the outer edge reduced-diameter portion from the turbine side in the axial direction, a step between the outer edge reduced-diameter portion and the outer edge increased-diameter portion is formed. On the basis of this step, it is possible to position the seal member fitted to the outer edge reduced-diameter portion in the axial direction.

In accordance with an aspect of the present invention, in order to achieve the object mentioned above, in the supercharger mentioned above, the seal housing has an inner edge increased-diameter portion which is formed in a leading end in the compressor side and in which a radius of the inner diameter is larger than the other portions of the inner edge, and an inner edge reduced-diameter portion which is connected to the inner edge increased-diameter portion from the turbine side in the axial direction and in which the radius of the inner edge is smaller than the inner edge increased-diameter portion, and an outer edge in a radial direction of the seal member has a radius which is larger than the radius of the inner edge of the inner edge reduced-diameter portion, and is brought into contact with an inner edge of the inner edge increased-diameter portion.

In this structure, since the outer edge in the radial direction of the seal member has the radius larger than the radius of the inner edge of the inner edge reduced-diameter portion of the seal housing, and is brought into contact with the inner edge of the inner edge increased-diameter portion of the seal housing, the lubricating oil flowing to the compressor side in the axial direction through a gap between the inner edge reduced-diameter portion of the seal housing and the portion (for example, the outer edge increased-diameter portion) closer to the turbine side than the outer edge reduced-diameter portion in the oil shield member is securely blocked by the seal member extending in the vertical direction to the axial direction so as to close the gap. In the above structure of the supercharger, by providing the inner edge reduced-diameter portion in the seal housing, it becomes possible to narrow a clearance that may cause oil leakage, further suppressing oil leakage.

Accordingly, it is possible to more securely block the lubricating oil flowing to the compressor side from the bearing structure, and it is possible to further increase the sealing performance to the compressor side against the lubricating oil in comparison with the conventional structure.

In accordance with a preferable aspect of the present invention, the oil seal structure has a retaining member retaining the seal member at a fixed position.

It is possible to retain the seal member at the fixed position by the retaining member.

In accordance with a preferable aspect of the present invention, in the supercharger mentioned above, the oil seal structure has a retaining member retaining the seal member at a fixed position, and a turbine side end surface of the retaining member is brought into contact with a compressor side end surface of the seal member, thereby retaining the seal member between the turbine side end surface and the outer edge increased-diameter portion of the oil shield member.

On the basis of this structure, it is possible to securely retain the seal member fitted to the outer edge reduced-diameter portion of the oil shield member between the turbine side end surface of the retaining member and the outer edge increased-diameter portion of the oil shield member. Meanwhile, the outer edge diameter of the retaining member may be larger than that of the outer edge increased-diameter portion of the oil shield member, thereby further suppressing oil leakage. Further, the axial-direction position of the inner edge increased-diameter portion of the seal housing may overlap with the axial-direction position of the radial-direction outer edge of the retaining member to narrow a clearance between the inner edge increased-diameter portion and the retaining member, further suppressing oil leakage.

In accordance with a preferable aspect of the present invention, the retaining member is constituted by the compressor impeller.

Since the compressor impeller is utilized as the retaining member, it is possible to retain the seal member at the fixed position without being provided with any new member.

Further, in accordance with a preferable aspect of the present invention, the retaining member is provided between the compressor impeller and the seal member.

As mentioned above, since the retaining member is provided between the compressor impeller and the seal member, it is possible to retain the seal member at the fixed position.

In accordance with a preferable aspect of the present invention, the retaining member is constituted by a sleeve provided between the compressor impeller and the seal member.

As mentioned above, since the sleeve is provided between the compressor impeller and the seal member, it is possible to retain the seal member at the fixed position.

In accordance with the other aspect of the present invention, the supercharger is further provided with an electric motor assisting the rotation of the rotating shaft, and a rotor of the electric motor is arranged as the retaining member between the compressor impeller and the seal member.

As mentioned above, since the rotor of the electric motor is arranged as the retaining member between the compressor impeller and the seal member, it is possible to retain the seal member at the fixed position.

As mentioned above, in accordance with the present invention, since the structure is made such that the seal member is fitted to the outer edge reduced-diameter portion formed in the leading end in the compressor side of the oil shield member, it is possible to fit the seal member to the outer edge reduced-diameter portion of the oil shield member only by moving the seal member in the axial direction from the compressor side at a time of assembling the supercharger, and it is possible to make the mounting work of the seal member more simple than the conventional one.

Further, in the present invention, since the outer edge in the radial direction of the seal member has the radius larger than the radius of the inner edge of the inner edge reduced-diameter portion of the seal housing, and is brought into contact with the inner edge of the inner edge increased-diameter portion of the seal housing, the lubricating oil flowing to the compressor side in the axial direction through the gap between the inner edge reduced-diameter portion of the seal housing and the outer edge increased-diameter portion of the oil shield member is securely blocked by the seal member extending in the vertical direction to the axial direction so as to close the gap. Accordingly, it is possible to more securely block the lubricating oil flowing to the compressor side from the bearing structure, and it is possible to further increase the sealing performance to the compressor side against the lubricating oil.

The other objects and advantages of the present invention will be apparent from the following description with reference to the accompanying drawings.

DESCRIPTION OF PREFERABLE EMBODIMENTS

Figure 1:
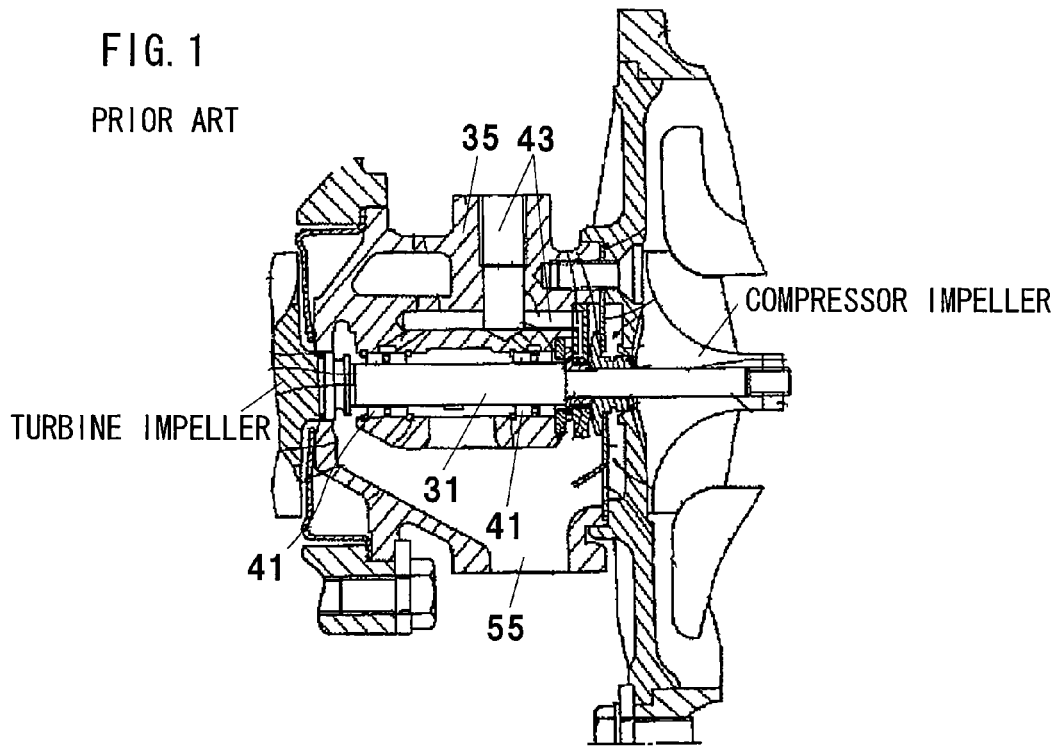
FIG. 1 is a view showing an entire structure of a conventional supercharger.

A description will be given of preferable embodiments in accordance with the present invention with reference to the accompanying drawings. In this case, the same reference numerals are attached to common portions in each of the drawings, and an overlapping description will be omitted.

Figure 3:
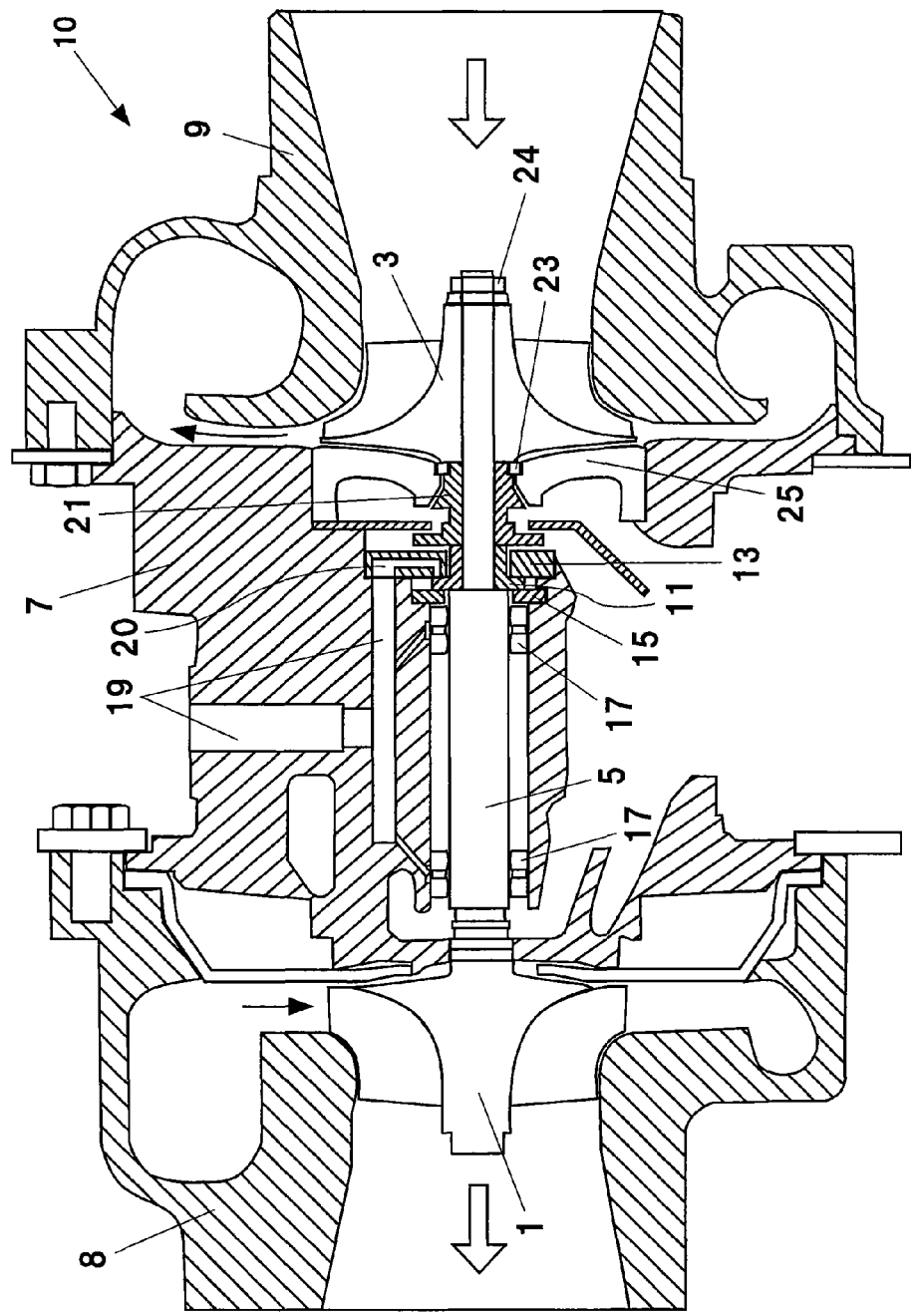
FIG. 3 is a view showing an entire structure of a supercharger in accordance with en embodiment of the present invention.

FIG. 3 is a vertical cross sectional view obtained by cutting a supercharger in accordance with an embodiment of the present invention in an axial direction, and shows an entire structure of the supercharger. As shown in FIG. 3, a supercharger 10 in accordance with the present embodiment is provided with a turbine impeller 1 rotatably driven by an exhaust gas, a compressor impeller 3 rotatably driven by a rotation of the turbine impeller 1 and compressing an air, a rotating shaft 5 coupling the turbine impeller 1 and the compressor impeller 3, and a housing 7 in which a bearing structure rotatably supporting the rotating shaft 5 is incorporated in an inner portion.

The housing 7 corresponds to a bearing housing separated from a turbine housing 8 accommodating the turbine impeller 1 in an inner portion and a compressor housing 9 accommodating the compressor impeller 3 in an inner portion, in the embodiment in FIG. 3. However, in accordance with the present invention, the housing accommodating the bearing structure in an inner portion may be constituted by a housing integrally formed with at least one of the turbine housing and the compressor housing.

As shown in FIG. 3, the bearing structure has a thrust bush 11 fixed to the rotating shaft 5, a normal thrust bearing 13 positioned in a compressor side of the thrust bush 11 and fixed to the bearing housing 7, and a counter thrust bearing 15 positioned in a turbine side of the thrust bush 11 and fixed to the bearing housing 7. Further, the bearing structure has a journal bearing 17 provided in each of the turbine side and the compressor side. Roles of these bearings are similar to the conventional case mentioned above with reference to FIGS. 1 and 2.

In order to supply a lubricating oil to the bearing structure mentioned above, an oil path 19 is formed in the housing 7, and a dedicated oil path 20 communicating with the oil path 19 and open to a pad surface is formed in the normal thrust bearing 13.

In order to prevent the lubricating oil supplied to the pad surface through the oil path 19 and the dedicated oil path 20 from leaking to the compressor side, an oil seal structure is incorporated in the compressor side of the bearing structure.

Figure 4:
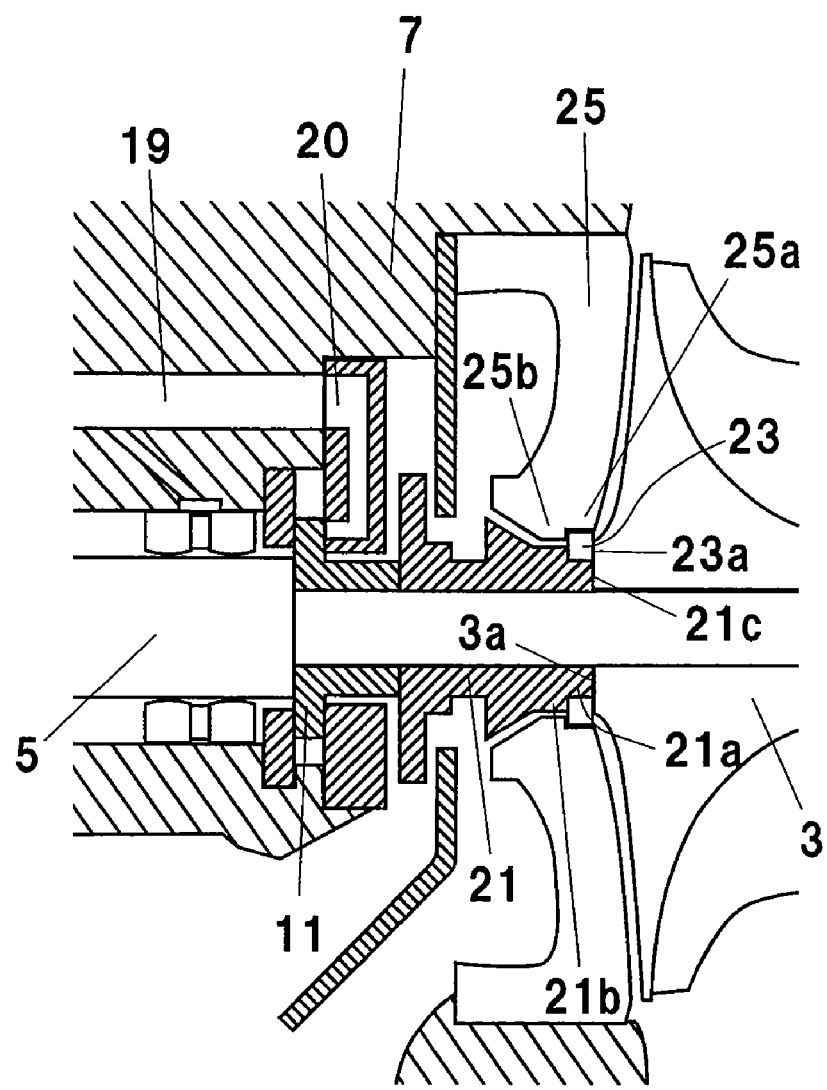
FIG. 4 is a partly enlarged view of FIG. 3 and shows an oil seal structure in accordance with the embodiment of the present invention.

As shown in FIG. 4, the oil seal structure has an oil shield member 21 fixed to the rotating shaft 5, a seal housing 25 fixed to the housing 7 in such a manner as to surround the oil shield member 21 in an outer side in a radial direction of the oil shield member 21, and an annular seal member 23 arranged between the oil shield member 21 and the seal housing 25. In this case, an outer edge of a vertical cross section to an axial direction of the oil shield member 21 may be formed partly in the other shape than a complete round shape in the axial direction as far as a rotation of the rotating shaft 5 is not adversely affected. Further, the seal member 23 is formed, for example, by a metal.

The oil shield member 21 has portions 21a and 21b in which an approximately circular outer edge is formed in the vertical cross section to the axial direction, in a leading end portion in the compressor side.

Particularly, in accordance with the present embodiment, the oil shield member 21 has an outer edge reduced-diameter portion 21a which is formed in the leading end in the compressor side and in which a radius of an outer edge in a radial direction is smaller than the other portions of the outer edge.

Further, the seal member 23 is fitted to the outer edge reduced-diameter portion 21a in the leading end in the compressor side of the oil shield member 21.

A description will be given of an assembly of the supercharger 10 having the structure mentioned above, with reference to FIGS. 3 and 4. Each of the members of the supercharger 10 can be incorporated in the bearing housing 7 in accordance with the following steps (1) to (10).

(1) Inserting the journal bearing 17 to the bearing housing 7 from the compressor side so as to attach to the bearing housing 7.

(2) Inserting the rotating shaft 5 integrally formed with the turbine impeller 1 to the journal bearing 17 attached to the bearing housing 7 from the turbine side.

(3) Passing the counter thrust bearing 15 to the rotating shaft 5 from the compressor side so as to fix to the bearing housing 7.

(4) Passing the thrust bush 11 to the rotating shaft 5 from the compressor side so as to attach to the rotating shaft 5.

(5) Passing the normal thrust bearing 13 to the rotating shaft 5 from the compressor side so as to fix to the bearing housing 7.

(6) Passing the oil shield member 21 to the rotating shaft 5 from the compressor side so as to attach to the rotating shaft 5.

(7) Passing the seal housing 25 to the rotating shaft 5 from the compressor side so as to fix to the bearing housing 7.

(8) Passing the seal member 23 to the rotating shaft 5 from the compressor side so as to fit to the outer edge reduced-diameter portion 21a of the oil shield member 21.

(9) Passing the compressor impeller 3 to the rotating shaft 5 from the compressor side so as to attach to the rotating shaft 5.

(10) Attaching the nut 24 to the rotating shaft 5 from the compressor side so as to fasten and fix the thrust bush 11, the oil shield member 21 and the compressor impeller 3 to the rotating shaft 5 by the nut 24.

Since it is possible to assemble the supercharger 10 as mentioned above, it is possible to attach to the oil shield member 21 in such a manner that the seal member 23 is fitted to the outer edge reduced-diameter portion 21a formed in the leading end in the compressor side of the oil shield member 21, only by moving the seal member 23 in the axial direction from the compressor side, at a time of assembling the supercharger 10.

Accordingly, it is possible to make a mounting work of the seal member 23 more simple than the conventional one.

Further, the outer edge reduced-diameter portion 21a is formed by executing a shoulder work for cutting a corner of the outer edge of the leading end in the compressor side of the oil shield member 21, and the seal member 23 is attached to the outer edge reduced-diameter portion 21a. Accordingly, it is not necessary to execute a groove work for forming a groove in an intermediate portion of the oil shield member 21 as is different from the prior art in FIG. 2, and it is possible to employ the shoulder work which is more simple than the groove work. Therefore, it is possible to work the mounting portion of the seal member 23 more simply than the conventional one.

In preferable, the oil shield member 21 has an outer edge increased-diameter portion 21b which is connected to the outer edge reduced-diameter portion 21a in the axial direction from the turbine side and in which a radius of an outer edge is larger than the outer edge reduced-diameter portion 21a.

As mentioned above, since the oil shield member 21 has the outer edge increased-diameter portion 21b connected to the outer edge reduced-diameter portion 21a in the axial direction from the turbine side, a step between the outer edge reduced-diameter portion 21a and the outer edge increased-diameter portion 21b is formed. On the basis of the step, it is possible to position the seal member 23 fitted to the outer edge reduced-diameter portion 21a in the axial direction. In other words, the seal member 23 fitted to the outer edge reduced-diameter portion 21a is positioned in the axial direction by being brought into contact with the outer edge increased-diameter portion 21b of the oil shield member 21 from the axial direction.

Further, in the embodiment shown in FIG. 4, the oil shield member 21 and the normal thrust bearing 13 are separated so as to be formed as the independent members, however, the oil shield member 21 and the thrust bush 11 may be integrally formed. In this case, the number of the parts is reduced and the structure becomes simple.

Figure 2:
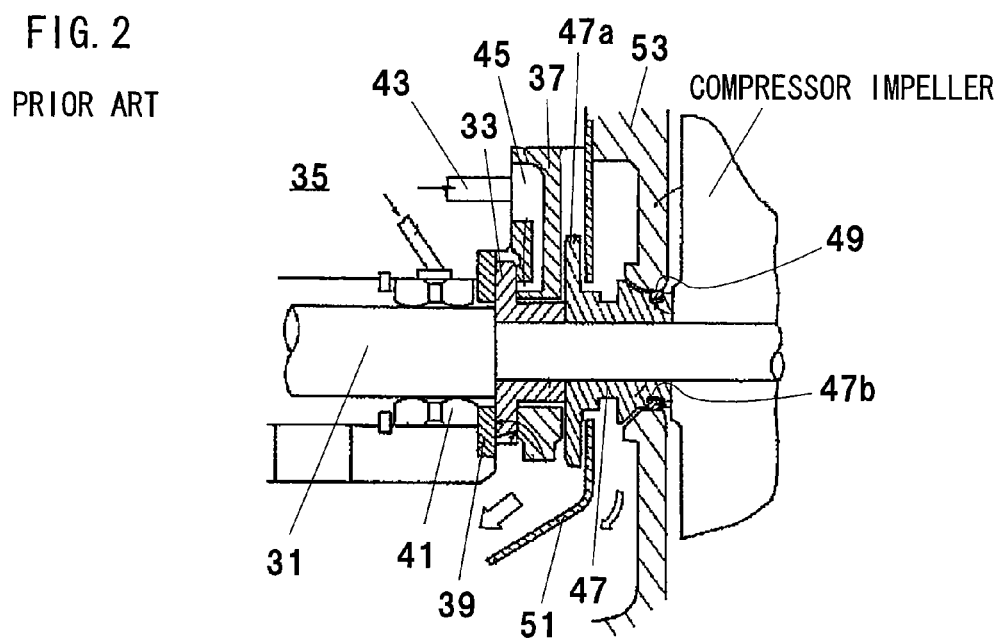
FIG. 2 is a partly enlarged view of FIG. 1 and shows conventional bearing structure and oil seal structure.

The other structures of the oil shield member 21 may be the same as the prior art in FIG. 2.

On the other hand, an opening in which the oil shield member 21 passes through a center portion vertical to the axial direction is formed in the seal housing 25 fixed to the housing 7. The opening may be formed approximately in a circular shape in the leading end portion in the compressor side.

Further, the seal housing 25 prevents the lubricating oil from leaking to the compressor side by being brought into contact with the seal member 23 in the inner edge in the radial direction forming the opening mentioned above over the peripheral direction.

The seal housing 25 has an inner edge increased-diameter portion 25a which is formed in the leading end in the compressor side and in which a radius of the inner edge in the radial direction is larger than the other portions of the inner edge, and an inner edge reduced-diameter portion 25b which is connected to the inner edge increased-diameter portion 25a in the axial direction from the turbine side and in which a radius of the inner edge is smaller than the inner edge increased-diameter portion 25a.

Particularly, in accordance with the present embodiment, the outer edge in the radial direction of the seal member 23 has a larger radius than the radius of the inner edge of the inner edge reduced-diameter portion 25b, and is brought into contact with the inner edge of the inner edge increased-diameter portion 25a over the peripheral direction.

In other words, the lubricating oil flows to the compressor side in the axial direction through a gap between the inner edge reduced-diameter portion 25b of the seal housing 25 and the outer edge increased-diameter portion 21b of the oil shield member 21, however, the seal member 23 extends in the vertical direction to the axial direction in such a manner as to close the gap. Accordingly, since the lubricating oil flowing to the compressor side through the gap is securely blocked by the seal member 23, it is possible to further increase the sealing performance to the compressor side against the lubricating oil. In addition, by providing the inner edge reduced-diameter portion 25b in the seal housing 25, it becomes possible to narrow a clearance formed between the inner edge reduced-diameter portion 25b and the outer edge increased-diameter portion 21b. Thereby, oil leakage through this clearance can be suppressed to more effectively prevent oil leakage.

Further, in accordance with the present embodiment, the turbine side end surface 3a of the compressor impeller 3 is brought into contact with the compressor side end surface 23a of the seal member 23, thereby positioning the seal member 23 between the turbine side end surface 3a and the outer edge increased-diameter portion 21b of the oil shield member 21 so as to retain.

As mentioned above, in accordance with the present embodiment, it is possible to retain the seal member 23 by utilizing the turbine side end surface 3a of the existing compressor impeller without preparing any new member. Accordingly, even if the leading end in the compressor side of the oil shield member 21 is formed as the outer edge reduced-diameter portion 21a corresponding to the mounting position of the seal member 23, it is possible to securely retain the seal member 23 by utilizing the turbine side end surface 3a of the existing compressor impeller 3.

In this case, in preferable, the turbine side end surface 3a of the compressor impeller 3 and the compressor side end surface 21c of the oil shield member 21 both extend in the vertical direction to the axial direction, and are brought into contact with each other in the axial direction, such as the embodiment shown in FIG. 4. Accordingly, it is possible to stably retain the seal member 23.

As mentioned above, the compressor impeller 3 serves as the retaining member retaining the seal member 23 at the fixed position, however, the other member may be provided as the retaining member in the supercharger.

In preferable, the retaining member is provided between the compressor impeller 3 and the seal member 23.

For example, the retaining member is constituted by a tubular sleeve provided between the compressor impeller 3 and the seal member 23.

Figure 5:
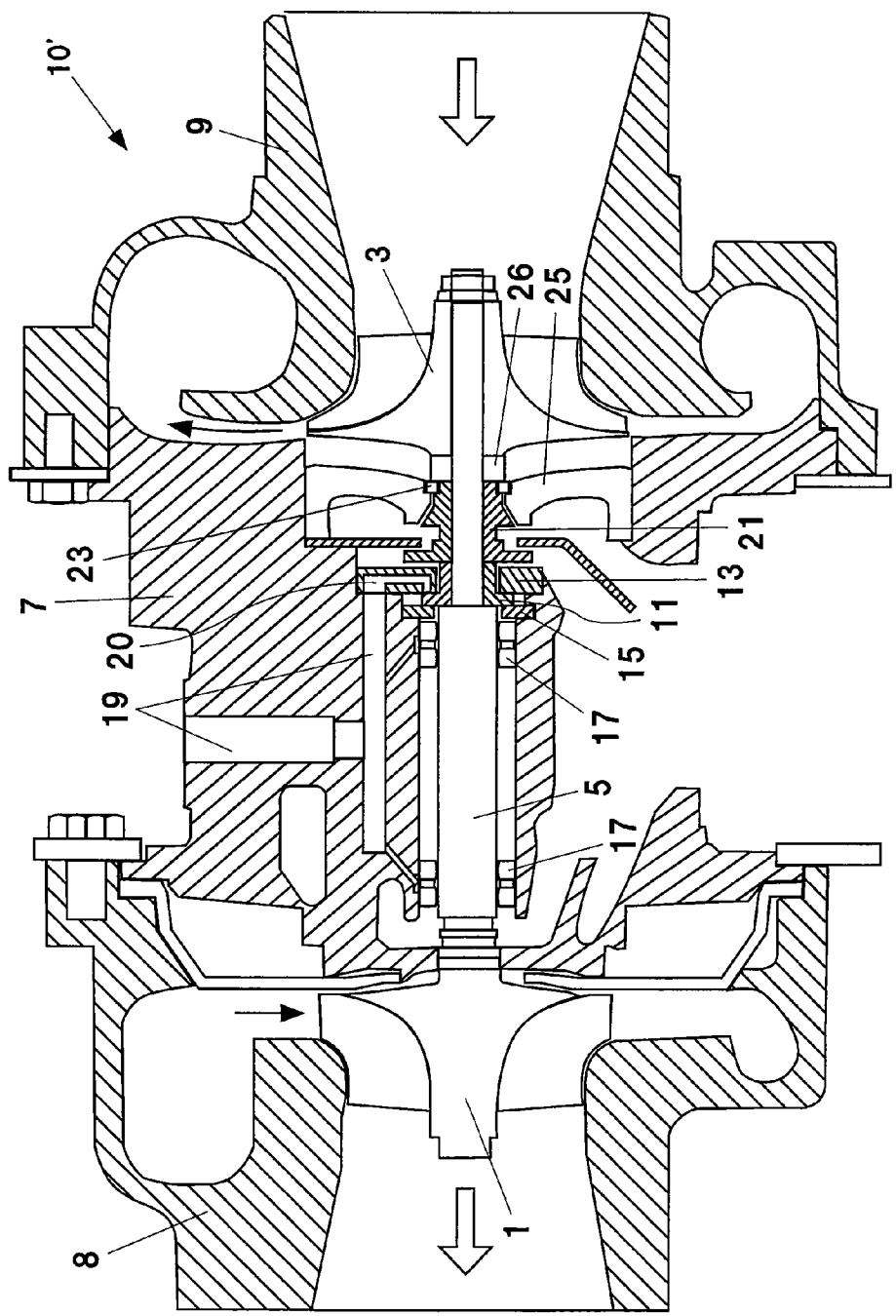
FIG. 5 is a view showing an entire structure of a supercharger in which a sleeve is provided as a retaining member of a seal member.
Figure 6:
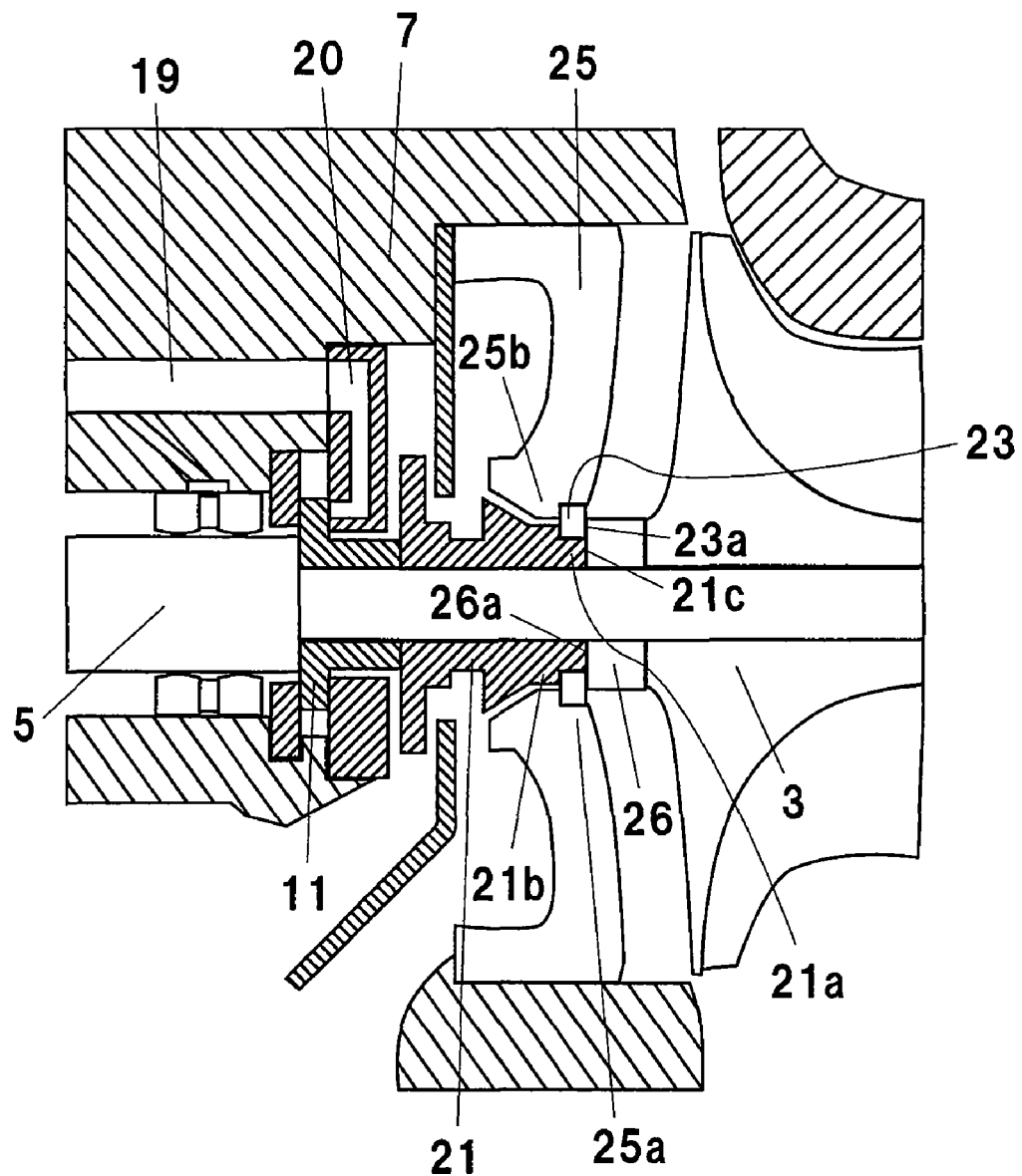
FIG. 6 is a partly enlarged view of FIG. 5 and shows a structure near the seal member.

FIG. 5 is a vertical cross sectional view showing a supercharger 10' in the case that a sleeve 26 is provided, and FIG. 6 is a partly enlarged view of FIG. 5 and shows a structure near the seal member 23.

As shown in FIG. 6, a turbine side end surface 26a of the sleeve 26 is brought into contact with the compressor side end surface 23a of the seal member 23, whereby it is possible to position the seal member 23 between the turbine side end surface 26a of the sleeve 25 and the outer edge increased-diameter portion 21b of the oil shield member 21 so as to retain.

To more effectively prevent oil leakage, the following structure may be adopted. The outer edge diameter of the retaining member 26 may be larger than that of the outer edge increased-diameter portion 21b of the oil shield member 21. In other words, the radial-direction outer edge of the retaining member 26 may be positioned radially outside the radial-direction outer edge of the outer edge increased-diameter portion 21b. Thereby, a path through which lubricating oil may pass becomes complicated to more effectively prevent oil leakage. Further, the axial-direction position of the inner edge increased-diameter portion 25a of the seal housing 25 may overlap with the axial-direction position of the radial-direction outer edge of the retaining member 26. In other words, the compressor-side end of the inner edge increased-diameter portion 25a may be closer to the compressor than the turbine-side end of the radial-direction outer edge of the retaining member 26 so as to overlap the inner edge increased-diameter portion 25a with the radial-direction outer edge of the retaining member 26 in terms of the axial-direction position. Thereby, it become possible to narrow a clearance (in this case, a clearance between the radial-direction inner edge of the inner edge increased-diameter portion 25a and the radial-direction outer edge of the retaining member 26) that may cause oil leakage. As a result, oil leakage can be more effectively prevented.

In this case, in preferable, the turbine side end surface 26a of the sleeve 26 and the compressor side end surface 21c of the oil shield member 21 both extend in the vertical direction to the axial direction, and are brought into contact with each other in the axial direction, such as the embodiment shown in FIG. 6. Accordingly, it is possible to stably retain the seal member 23.

The other structures of the supercharger 10' in FIGS. 5 and 6 are the same as the case in FIGS. 3 and 4.

Further, in the case that the supercharger is further provided with an electric motor assisting the rotation of the rotating shaft 5, a rotor of the electric motor may be set to the retaining member and may be arranged between the compressor impeller 3 and the seal member 23.

Figure 7:
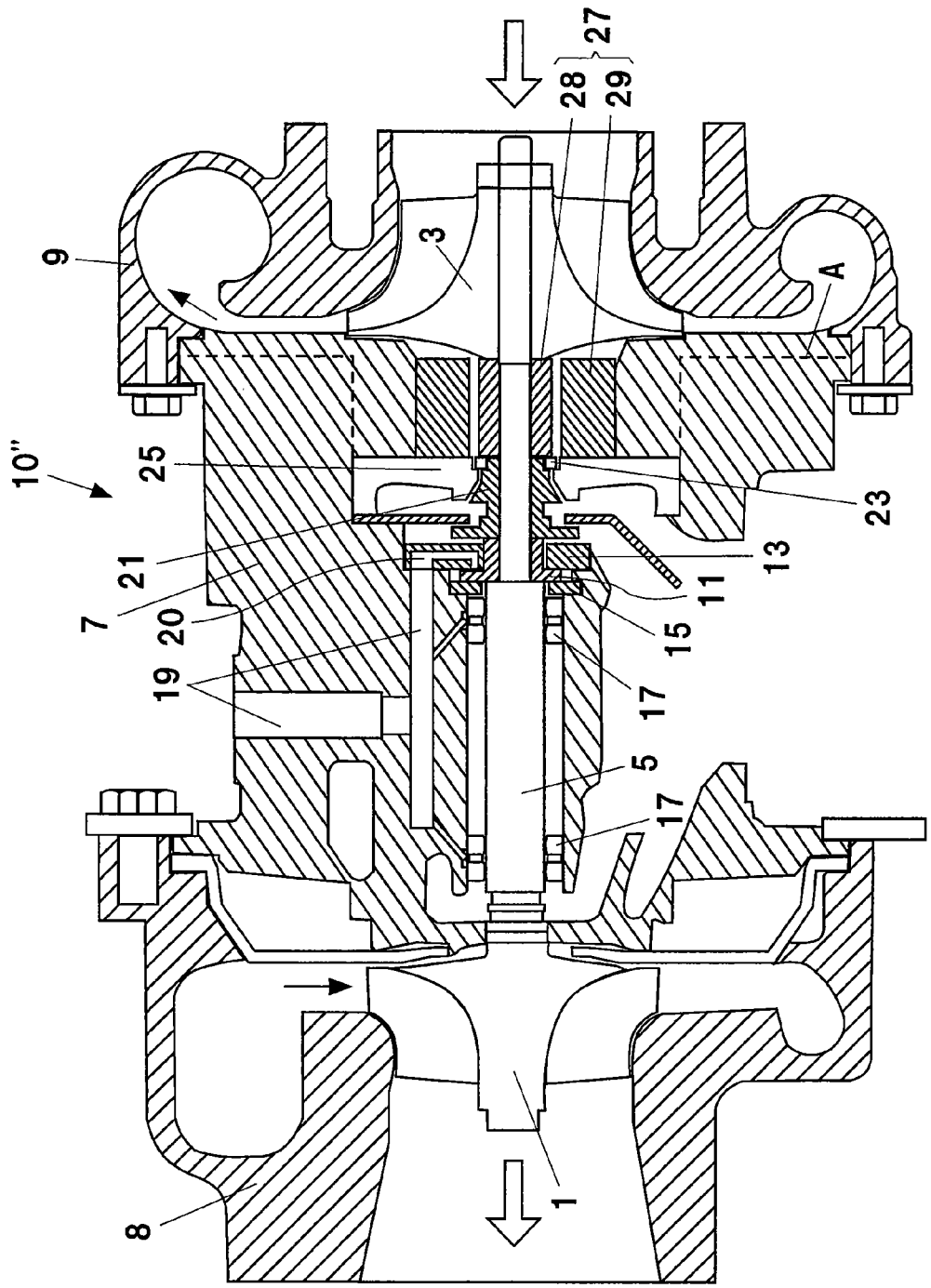
FIG. 7 is a view showing an entire structure of a supercharger in which a rotor of an electric motor is utilized as a retaining member.
Figure 8:
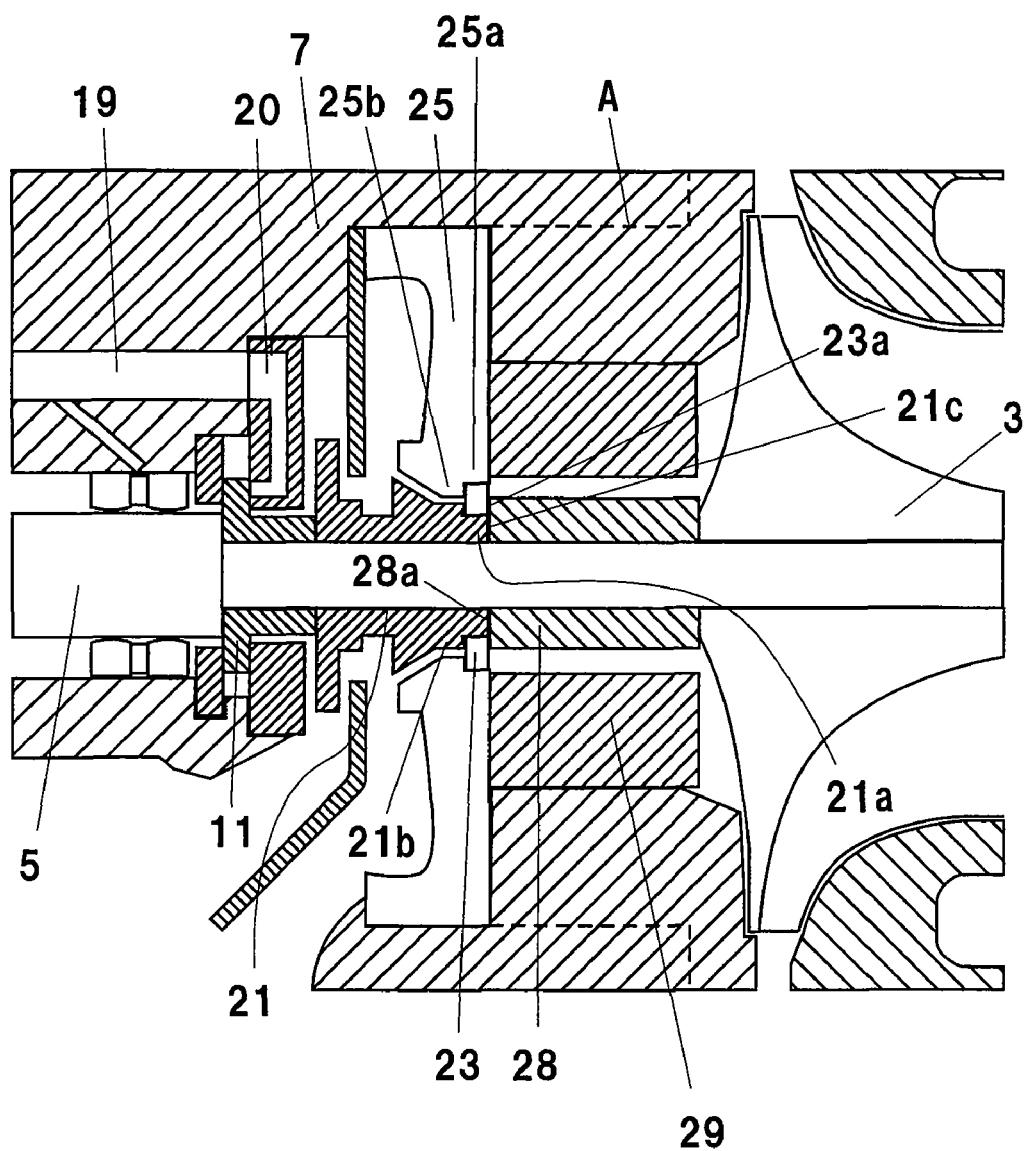
FIG. 8 is a partly enlarged view of FIG. 7 and shows a structure near a seal member.

FIG. 7 is a vertical cross sectional view showing a supercharger 10" in the case that an electric motor 27 is incorporated, and FIG. 8 is a partly enlarged view of FIG. 7 and shows a structure near the seal member 23. In FIGS. 7 and 8, bearing housing 7 is formed by combining members that are divided as shown by the broken line A.

The electric motor 27 includes a rotor 28 fixed to the rotating shaft 5, and a stator 29 provided in an outer side in a radial direction of the rotor 28. The rotor 28 is constituted by a plurality of permanent magnets arranged in a peripheral direction, and the stator 29 is constituted by a plurality of coils arranged in the peripheral direction. An electric power is supplied to the stator 29 from an outer portion of the supercharger 10" by a power supply line (not shown) so as to assist the rotation of the rotating shaft 5.

As shown in FIG. 8, a turbine side end surface 28a of the rotor 28 is brought into contact with the compressor side end surface 23a of the seal member 23, whereby it is possible to position the seal member 23 between the turbine side end surface 28a of the rotor 28 and the outer edge increased-diameter portion 21b of the oil shield member 21 so as to retain.

In this case, in preferable, the turbine side end surface 28a of the rotor 28 and the compressor side end surface 21c of the oil shield member 21 both extend in the vertical direction to the axial direction, and are brought into contact with each other in the axial direction, such as the embodiment shown in FIG. 8. Accordingly, it is possible to stably retain the seal member 23.

The other structures of the supercharger 10" in FIGS. 7 and 8 are the same as the case of FIGS. 3 and 4.

As mentioned above, in the supercharger in accordance with the embodiment mentioned above, since the seal member is fitted to the outer edge reduced-diameter portion formed in the leading end in the compressor side of the oil shield member, it is possible to attach the oil shield member only by moving the seal member in the axial direction from the compressor side at a time of assembling the supercharger, and it is possible to make the mounting work of the seal member more simple than the conventional one.

Further, the supercharger in accordance with the embodiment mentioned above is structured such that the lubricating oil flowing to the compressor side in the axial direction through the gap between the inner edge reduced-diameter portion of the seal housing and the outer edge increased-diameter portion of the oil shield member is blocked by the seal member extending in the vertical direction to the axial direction in such a manner as to close the gap. Accordingly, it is possible to more securely block the lubricating oil flowing to the compressor side from the bearing structure, and it is possible to further increase the sealing performance to the compressor side against the lubricating oil in comparison with the conventional one.

In this case, it goes without saying that the present invention is not limited to the embodiments mentioned above, but can be variously modified within the scope of the present invention.

What is claimed is:

1. A supercharger comprising:
   (a) a turbine impeller rotationally driven by an exhaust gas;
   (b) a compressor impeller rotationally driven by rotation of the turbine impeller, wherein the compressor impeller compresses air when rotationally driven;
   (c) a rotating shaft coupling the turbine impeller and the compressor impeller;
   (d) a first housing in which a bearing structure rotatably supporting the rotating shaft is incorporated in an inner portion of the first housing; and
   (e) an oil seal structure preventing a lubricating oil supplied to the bearing structure from leaking to a compressor side of the bearing structure, wherein the oil seal structure is incorporated in the compressor side of the bearing structure, wherein the oil seal structure has
  i. an oil shield member fixed to the rotating shaft;
  ii. a seal housing fixed to the first housing so as to surround the oil shield member in an outer side in a radial direction of the oil shield member; and
  iii. an annular seal member arranged between the oil shield member and the seal housing, wherein the oil shield member is provided with a first portion having an approximately circular outer edge formed in a vertical cross section to an axial direction in a leading end portion of the compressor side, and the oil shield member has a first outer edge reduced-diameter portion that is formed in a leading end in the compressor side and in which a radius of the first outer edge reduced diameter portion becomes smaller than other portions of the outer edge of the first portion of the oil shield member, wherein the annular seal member is fitted to the first outer edge reduced-diameter portion, and an opening in which the oil shield member passes through a center portion of the vertical cross section to the axial direction is formed in the seal housing, and the seal housing is brought into contact with the annular seal member in an inner edge in a radial direction forming the opening, thereby preventing the lubricating oil from leaking to the compressor side, wherein the oil shield member has a second outer edge increased-diameter portion that is connected to the first outer edge reduced-diameter portion from the turbine side in the axial direction and in which a radius of the second outer edge reduced diameter portion is larger than the first outer edge reduced-diameter portion, wherein the seal housing has
  i. a first inner edge increased-diameter portion that is formed in a leading end in the compressor side and in which a radius of the first inner edge increased-diameter portion is larger than other portions of an inner edge of the seal housing; and
  ii. a second inner edge reduced-diameter portion that is connected to the first inner edge increased-diameter portion from the turbine side in the axial direction and in which the radius of the second inner edge reduced-diameter portion is smaller than the first inner edge increased-diameter portion, and an outer edge in a radial direction of the annular seal member has a radius that is larger than the radius of the inner edge of the inner edge reduced-diameter portion, and the outer edge in the radial direction of the annular seal member is brought into contact with an inner edge of the inner edge increased-diameter portion, wherein the first outer edge reduced-diameter portion and the second outer edge increased-diameter portion of the oil shield member form a first shoulder, and the first inner edge increased-diameter portion and the second inner edge reduced-diameter portion of the seal housing form a second shoulder, wherein the first shoulder and the second shoulder are disposed together to form a groove that is open in the axial direction toward the compressor impeller, and the annular seal member is inserted in the groove formed by the first shoulder and the second shoulder.

2. The supercharger as claimed in claim 1, wherein the oil seal structure has a retaining member retaining the seal member at a fixed position.

3. The supercharger as claimed in claim 2, wherein the retaining member is formed by the compressor impeller.

4. The supercharger as claimed in claim 2, wherein the retaining member is provided between the compressor impeller and the seal member.

5. The supercharger as claimed in claim 2, wherein the retaining member comprises a sleeve provided between the compressor impeller and the annular seal member.

6. The supercharger as claimed in claim 2, wherein the supercharger is further provided with an electric motor assisting the rotation of the rotating shaft, and a rotor of the electric motor is arranged as the retaining member between the compressor impeller and the seal member.

7. The supercharger as claimed in claim 1, wherein the oil seal structure has a retaining member retaining the annular seal member at a fixed position, and a turbine side end surface of the retaining member is brought into contact with a compressor side end surface of the annular seal member, thereby retaining the annular seal member between the turbine side end surface of the retaining member and the outer edge increased-diameter portion of the oil shield member.

8. The supercharger as claimed in claim 7, wherein the retaining member is formed by the compressor impeller.

9. The supercharger as claimed in claim 7, wherein the retaining member is provided between the compressor impeller and the seal member.

10. The supercharger as claimed in claim 7, wherein the retaining member comprises a sleeve provided between the compressor impeller and the annular seal member.

11. The supercharger as claimed in claim 7, wherein the supercharger is further provided with an electric motor assisting the rotation of the rotating shaft, and a rotor of the electric motor is arranged as the retaining member between the compressor impeller and the seal member.

\* \* \* \* \*